(12) United States Patent
Nojima et al.

(10) Patent No.: US 7,824,625 B2
(45) Date of Patent: Nov. 2, 2010

(54) DEHYDROGENATION FUEL THEFT PREVENTION SYSTEM

(75) Inventors: Masafumi Nojima, Tokai (JP); Akiyoshi Komura, Hitachi (JP); Takao Ishikawa, Hitachi (JP); Kenichi Souma, Mito (JP); Masatoshi Sugimasa, Tokai (JP); Naoki Yoshimoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/372,749

(22) Filed: Feb. 18, 2009

(65) Prior Publication Data

US 2009/0246088 A1 Oct. 1, 2009

(30) Foreign Application Priority Data

Mar. 31, 2008 (JP) ............................. 2008-089187

(51) Int. Cl.
*G05B 9/00* (2006.01)
(52) U.S. Cl. .................. 422/117; 48/127.7; 48/214 A; 48/61; 429/90
(58) Field of Classification Search ................ 48/127.7, 48/214 A, 61; 422/117, 112; 429/17, 19, 429/90; 44/385, 410; 585/654, 899
See application file for complete search history.

(56) References Cited

U.S. PATENT DOCUMENTS 5,861,137 A * 1/1999 Edlund ........................ 423/652
7,201,783 B2 * 4/2007 Edlund ........................ 48/127.7
2006/0269804 A1 * 11/2006 Nakamura et al. ............ 429/22

FOREIGN PATENT DOCUMENTS

| GB | 2 283 235 | * | 5/1995 |
| JP | 04173895 | * | 5/1992 |
| JP | 08060167 | * | 3/1996 |
| JP | 2004-107138 |  | 4/2004 |
| WO | WO 2008033301 | * | 3/2008 |

* cited by examiner

*Primary Examiner*—N. Bhat
(74) *Attorney, Agent, or Firm*—Antonelli, Terry, Stout & Kraus, LLP.

(57) ABSTRACT

A dehydrogenation fuel theft prevention system for preventing the theft of dehydrogenation organic fuel containing hydrogen is provided. The dehydrogenation fuel theft prevention system is for systems including a reformer for dehydrogenating organic fuel containing at least hydrogen and a dehydrogenation fuel recovery tank for storing dehydrogenation fuel produced when organic fuel is dehydrogenated in the reformer. The theft prevention system is provided with a means for mixing an odorant as a component with a pungent odor other than the fuel components or a agent for coagulating the fuel components. The odorant or the coagulating agent is mixed when fuel is manufactured, distributed, utilized, recovered, or stored or fuel is about to be stolen.

10 Claims, 5 Drawing Sheets

DEHYDROGENATION FUEL THEFT PREVENTION SYSTEM

CLAIM OF PRIORITY

The present application claims priority from Japanese Patent Application No. 2008-089187 filed on Mar. 31, 2008, the content of which is hereby incorporated by reference into this application.

BACKGROUND OF THE INVENTION

1. Field of the Invention

The present invention relates to a technology for preventing the theft of dehydrogenation organic fuel containing hydrogen.

2. Description of the Related Art

As global warming due to carbon dioxide or the like becomes serious, hydrogen has gained the spotlight as an energy source responsible for the next generation in place of fossil fuel. Fuel-cell-power generation systems utilizing hydrogen to generate electric power are capable of efficiently recovering electricity and thermal energy produced when hydrogen and oxygen are reacted with each other and they are turned into water. In recent years, the technology therefore have been rapidly developed as a power source for a wide variety of applications, including automobiles, home generating equipment, vending machines, cellular phones, and the like.

Meanwhile, the transportation, storage, and supply systems for hydrogen, which are indispensable for using hydrogen as fuel, have become a major challenge. Since hydrogen is gaseous at ordinary temperature, it is more difficult to store and transport than liquid and solid. In addition, hydrogen is a combustible material and there is a possibility of explosion when it is mixed with air at a predetermined mixture ratio.

As one of technologies for solving this problem, organic hydride systems using hydrocarbon such as methylcyclohexane and decalin has attracted attention (for example, see JP-A-2004-107138). They provide a hydrogen storage method excellent in safety, transportability, storage capability, and cost reduction capability by mounting a reformer in an automobile. Since these hydrocarbons are liquid at ordinary temperature, they are excellent in transportability.

Methylcyclohexane and toluene are cyclic hydrocarbons identical in carbon number. However, toluene is an unsaturated hydrocarbon with carbons doubly-bonded with each other while methylcyclohexane is a saturated hydrocarbon without double bonds. Methylcyclohexane is obtained by the hydrogenation reaction of toluene and toluene is obtained by the dehydrogenation reaction of methylcyclohexane. That is, hydrogen can be stored and supplied by utilizing the hydrogenation and dehydrogenation reactions of these hydrocarbons.

However, the above technology also involves a lot of problems. For example, when methylcyclohexane is used as hydrogen carrier to dehydrogenate it in an automobile, methylcyclohexane that induced a dehydrogenation reaction in a reformer produces toluene and hydrogen and this toluene is stored as dehydrogenation fuel in the automobile.

Toluene is an organic solvent used as adhesive or solvent in painting, bonding, and the like. If high-concentration toluene is rapidly inhaled or low-concentration toluene is chronically inhaled, an affection may be caused in various internal organs including nervous system. Similarly, since toluene is highly volatile at ordinary temperature and ordinary pressure and easily soluble in fat, it is absorbed through a respiratory tract or a skin mucosa and causes toxicity to various internal organs. When a person inhales toluene, he/she suffers from central nervous system damage and has a feeling of euphoria at an early stage and subsequently develops giddiness, confusion, hallucination, or disturbance of consciousness. Chronically intoxicated persons produce cerebeller ataxic symptoms, such as walking in tottering gait, incapability to correctly grasp an object, and hand tremor when making action, and other various symptoms, such as tinnitus, paropsia, and electroencephalogram abnormality. Though toluene is a agent that has harmful effect on human bodies as mentioned above, some people are willing to inhale toluene to get the initial feeling of euphoria.

For this reason, toluene is specified as non-medicinal deleterious agent by the Poisonous and Deleterious Agents Control Law and it is difficult for ordinary citizens to get it. However, if toluene is stored as dehydrogenation fuel in an automobile or a fueling station when organic hydride is distributed, a problem of the possibility of theft arises.

With the above-mentioned problem taken into account, it is an object of the invention to provide a dehydrogenation fuel theft prevention system for preventing the theft of dehydrogenation organic fuel containing hydrogen.

SUMMARY OF THE INVENTION

The invention is a dehydrogenation fuel theft prevention system for systems including a reformer for dehydrogenating and extracting hydrogen from the organic fuel containing at least hydrogen and a dehydrogenation fuel recovery tank for storing dehydrogenation fuel produced when organic fuel is dehydrogenated in the reformer. The dehydrogenation fuel theft prevention system is characterized in that it includes a means for mixing an antitheft agent such as an odorant that is a component with a pungent odor other than the fuel components for marking, or a agent for coagulating the fuel components. The odorant is mixed when fuel is manufactured, distributed, utilized, recovered, or stored or the dehydrogenation fuel is about to be stolen. The coagulating agent is mixed when dehydrogenation fuel is about to be stolen.

According to the invention, it is possible to provide a method and a system for dehydrogenation fuel theft prevention for preventing the theft of dehydrogenation organic fuel containing hydrogen.

DETAILED DESCRIPTION OF THE PREFERRED EMBODIMENTS

The invention is a system for dehydrogenation fuel theft prevention. This dehydrogenation fuel theft prevention system is characterized in that it includes a fuel tank and a fuel passage and an odorant or a coagulating agent provided in the walls of the fuel tank and fuel passage.

In addition, the above system is characterized in that: a flow or pressure sensor is provided on the inner wall of either the fuel tank or the fuel passage; a tank for storing an odorant or a coagulating agent in the fuel tank or in any other place is provided; the fuel tank and fuel passage and the tank for storing the odorant or the coagulating agent are connected together through a pipe; a part of the pipe provides an electromagnetic valve; and the sensor and the electromagnetic valve are wired together and the electromagnetic valve can be opened and closed by a signal from the sensor.

The above system is characterized in that it includes: a dehydrogenation fuel reclaiming apparatus that adds hydrogen to dehydrogenation fuel in the dehydrogenation fuel recovery tank to reclaim fuel; a first fuel tank for storing fuel reclaimed by the dehydrogenation fuel reclaiming apparatus; a concentration measurement device that measures the concentration of odorant in fuel stored in the first fuel tank; an odorant tank for storing odorant; a second fuel tank for storing fuel without the odorant added thereto; a pipe connecting the first fuel tank, odorant tank, and second fuel tank; and a valve provided in the pipe. The quantities of fuel and odorant supplied from the odorant tank and second fuel tank to the first fuel tank are adjusted based on the concentration of odorant measured by the concentration measurement device.

First Embodiment

Figure 1:
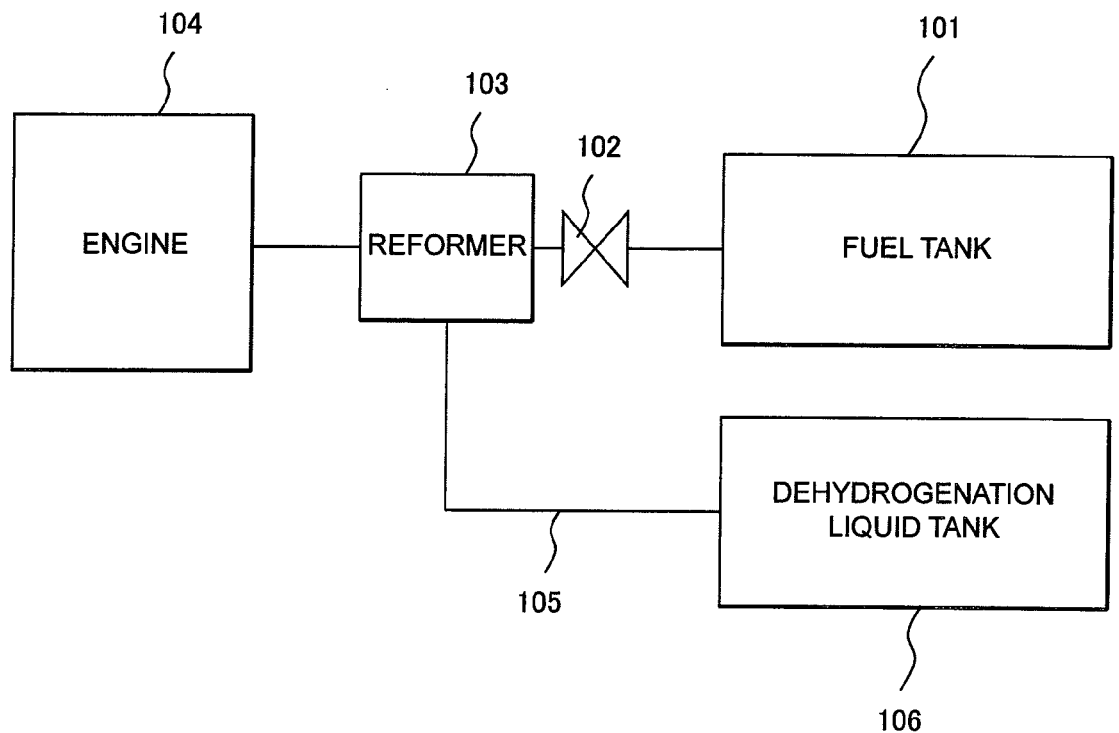
FIG. 1 is a block diagram of a fuel supply system.

Hereafter, description will be given to an embodiment of the system for dehydrogenation fuel theft prevention of the invention with reference to the drawings. FIG. 1 is a schematic diagram of a fuel supply system to which a dehydrogenation fuel theft prevention system in the first embodiment of the invention is applied. A fuel tank 101 is filled with organic hydride and the fuel is supplied from this fuel tank 101 to a reformer 103 at the time of fuel supply.

For the organic hydride as fuel, for example, methylcyclohexane is used and any other publicly known material can be used. The fuel is dehydrogenated in the reformer 103 and, when the fuel is organic hydride, hydrogen is extracted and supplied to an engine 104. As the result of dehydrogenating, dehydrogenation fuel is produced in addition to hydrogen. (When the fuel is methylcyclohexane, the dehydrogenation fuel is toluene.) The dehydrogenation fuel goes through a dehydrogenation fuel flow path 105 and is recovered into a dehydrogenation fuel tank 106. In this embodiment, the dehydrogenation fuel theft prevention system is provided in the dehydrogenation fuel flow path 105 and the dehydrogenation fuel tank 106.

Figure 2:
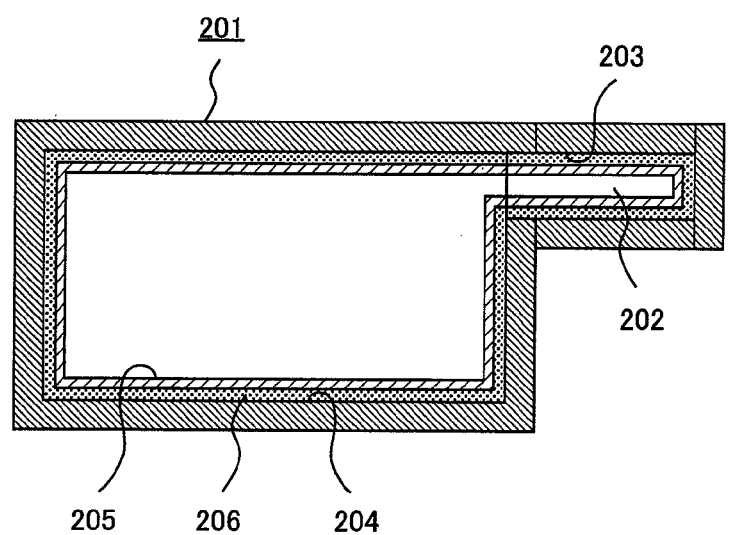
FIG. 2 is a schematic diagram of a dehydrogenation fuel theft prevention system in a first embodiment.

FIG. 2 is a sectional schematic view of a dehydrogenation fuel tank 201 and a dehydrogenation fuel flow path 202. The inner circumferential portion 204 of the dehydrogenation fuel tank 201 and the inner circumferential portion 203 of the dehydrogenation fuel flow path 202 are coated with a layer of odorant or a coagulating agent 206. For this odorant 206, for example, amines, ammonia, or nitrate liquids are used but other materials may be used. For the coagulating agent 206, organogel is used but other materials may be used.

A protective layer 205 that is a non-air-permeable member is provided so that it covers the odorant or coagulating agent 206. As a result, the space encircled with the protective layer 205 and the inner circumferential portion 204 of the dehydrogenation fuel tank 201 and inner circumferential portion 203 of the dehydrogenation fuel flow path 202, is sealed and is filled with the odorant or coagulating agent 206.

In the case an odorant is used as an antitheft agent, if a hole is drilled in the protective layer 206 and the wall of the dehydrogenation fuel tank 201 from the outside in an attempt to take dehydrogenation fuel out of the dehydrogenation fuel tank 201, the following takes place: the odorant flows to outside the dehydrogenation fuel tank 201 or the protective layer 205. With the inner circumferential portion 204 of the dehydrogenation fuel tank 201 and the inner circumferential portion 203 of the dehydrogenation fuel flow path 202 coated with the odorant, the odorant flows into the dehydrogenation fuel. As a result, an odor is added to the dehydrogenation fuel and the smell of the dehydrogenation fuel can be changed and marked.

In the case an coagulating agent is used as an antitheft agent, with the inner circumferential portion 204 of the dehydrogenation fuel tank 201 and inner circumferential portion 203 of the dehydrogenation fuel flow path 202 coated with the coagulating agent 206, the following takes place: the coagulating agent 206 that has flowed into the dehydrogenation fuel reacts with the dehydrogenation fuel and immediately turns the dehydrogenation fuel into a gel, which is difficult to take out. Thus theft can be prevented.

The dehydrogenation fuel theft prevention system of the invention is also applicable to, for example, a fuel supply system that supplies dehydrogenated fuel to other equipment than engine or the like, aside from the fuel supply system illustrated in FIG. 1.

Second Embodiment

Figure 3:
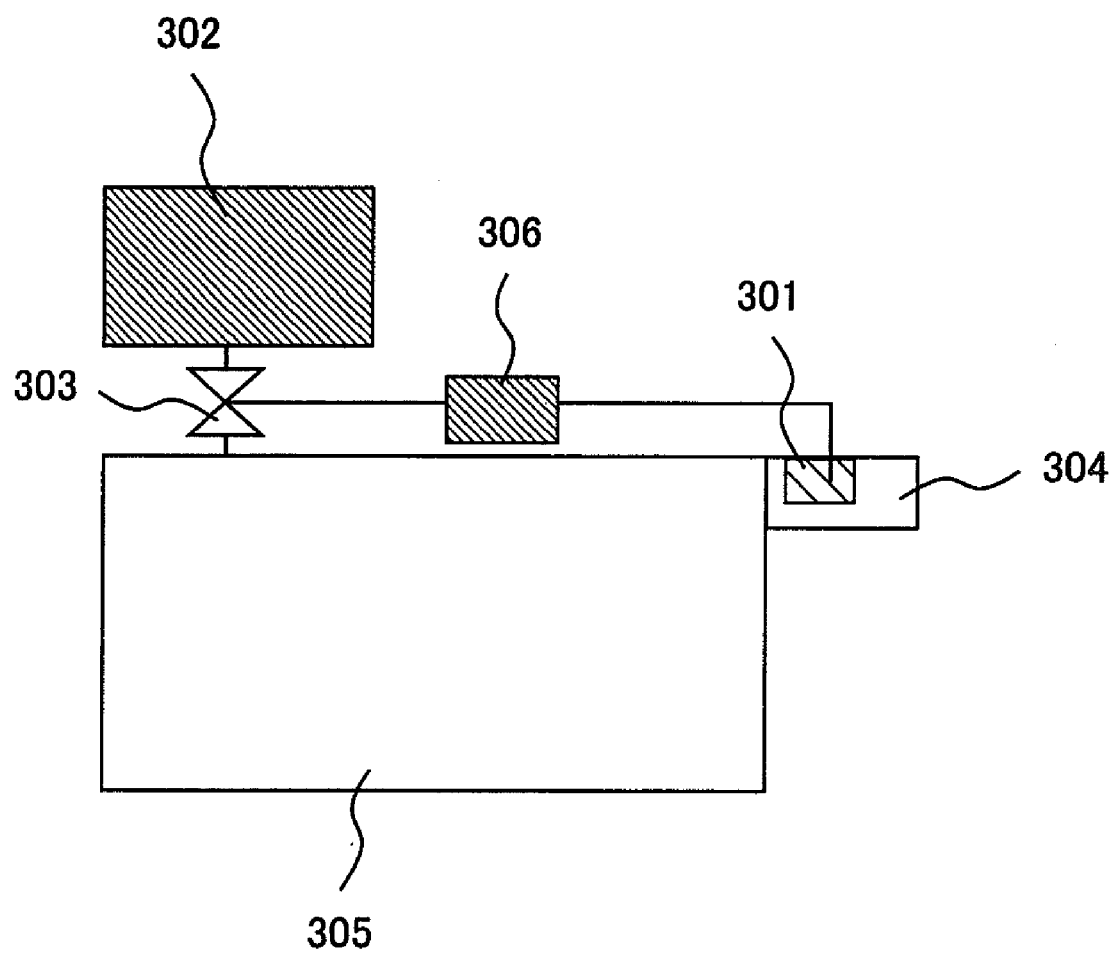
FIG. 3 is a schematic diagram of a dehydrogenation fuel theft prevention system in a second embodiment.

FIG. 3 is a schematic diagram of a fuel supply system to which the system for dehydrogenation fuel theft prevention in an embodiment of the invention. The dehydrogenation fuel theft prevention system in FIG. 3 is applied in the dehydrogenation fuel flow path 105 and the dehydrogenation fuel tank 106 of the fuel supply system illustrated in FIG. 1.

The dehydrogenation fuel theft prevention system in this embodiment includes: a flow sensor or a pressure sensor 301 provided in a dehydrogenation fuel flow path 304; a tank 302 for storing an odorant or a coagulating agent, provided separately from a dehydrogenation fuel tank 305; a pipe connecting the dehydrogenation fuel tank 305 and the tank 302; an electromagnetic valve 303 provided in a part of the pipe; and a control processor 306 electrically connected with the sensor 301 and the electromagnetic valve 303. The control processor 306 controls the actuation of the electromagnetic valve 303.

Figure 4:
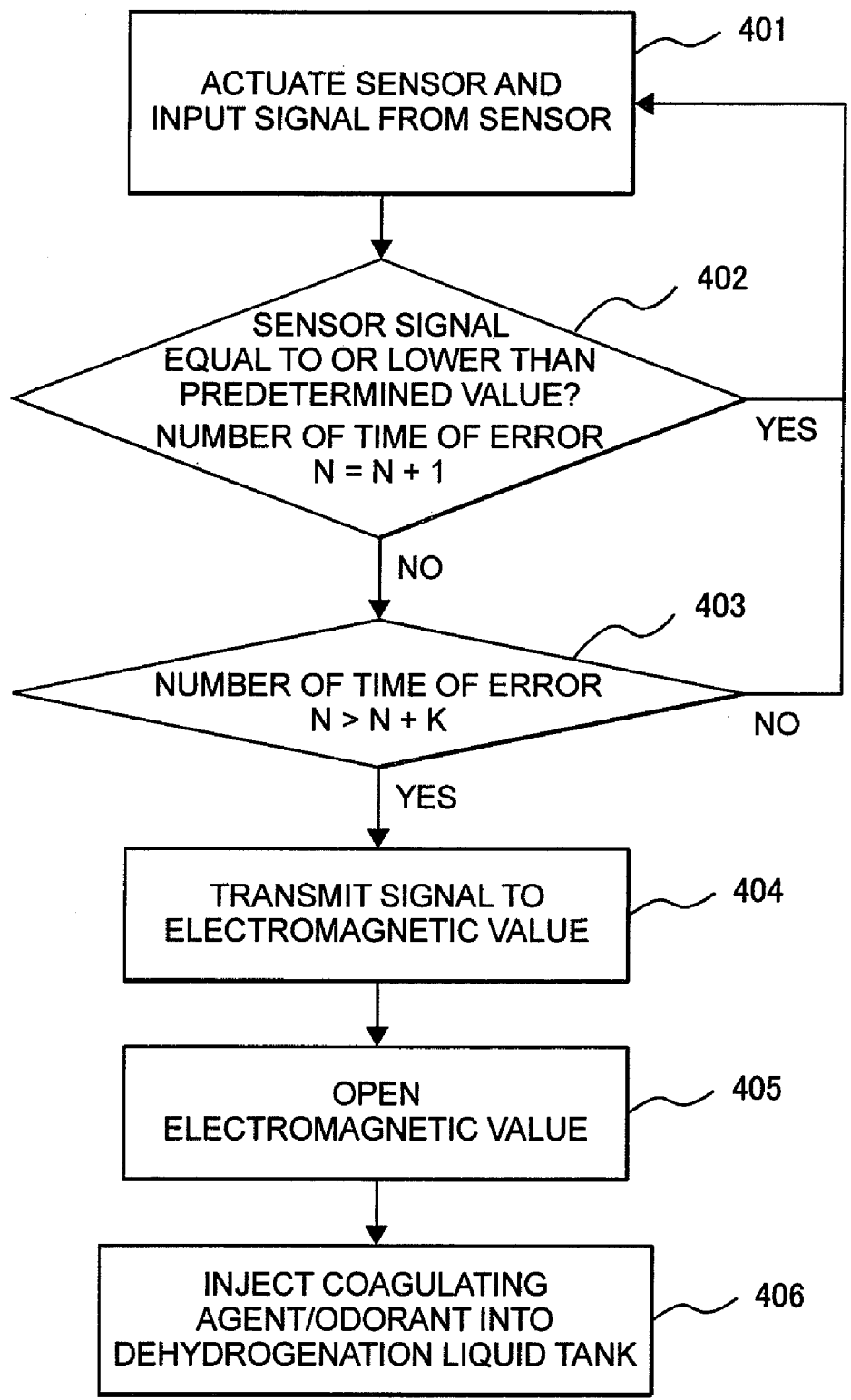
FIG. 4 is a process flowchart of the dehydrogenation fuel theft prevention system in the second embodiment.

Description will be given to the theft prevention method in this system with reference to the flowchart in FIG. 4. First, information on the flow rate or pressure of fuel in the dehydrogenation fuel flow path 304 is received from the sensor 301 by the control processor 306. In the control processor 306, when the received signal is equal to or lower than a predetermined value, it is determined that no anomaly has occurred and a signal is received again. When the received signal is higher than the predetermined value, it is handled as first signal error. The number of times of signal error is stored in a memory of the control processor 306, and when the number of the error reaches to an arbitrary number k in a predetermined time, it is determined that theft has occurred and the subsequent processing is carried out.

When it is determined that theft has occurred, a signal is transmitted from the control processor 306 to the electromagnetic valve 303. In response to this signal, the electromagnetic valve 303 is opened and the odorant or the coagulating agent are injected from the odorant or coagulating agent tank 302 into the dehydrogenation fuel tank 305. The odorant that has flowed into the dehydrogenation fuel is mixed with the dehydrogenation fuel and changes the smell of the dehydrogenation fuel. The coagulating agent that has flowed into the dehydrogenation fuel reacts with the dehydrogenation fuel and immediately turns the dehydrogenation fuel into a gel, which is difficult to take out. Thus theft can be prevented.

This embodiment may be so constructed that the sensor processes encrypted signal and handles only some signal as non-error or does not output an error signal only for some special signal. In this case, a dispenser for recovering dehydrogenation fuel is provided with a signal generator that outputs the special encrypted signal. This makes it possible to determine only change in fuel when dehydrogenation fuel is recovered as non-abnormal processing and actuate the theft prevention system in the other cases.

Third Embodiment

Figure 5:
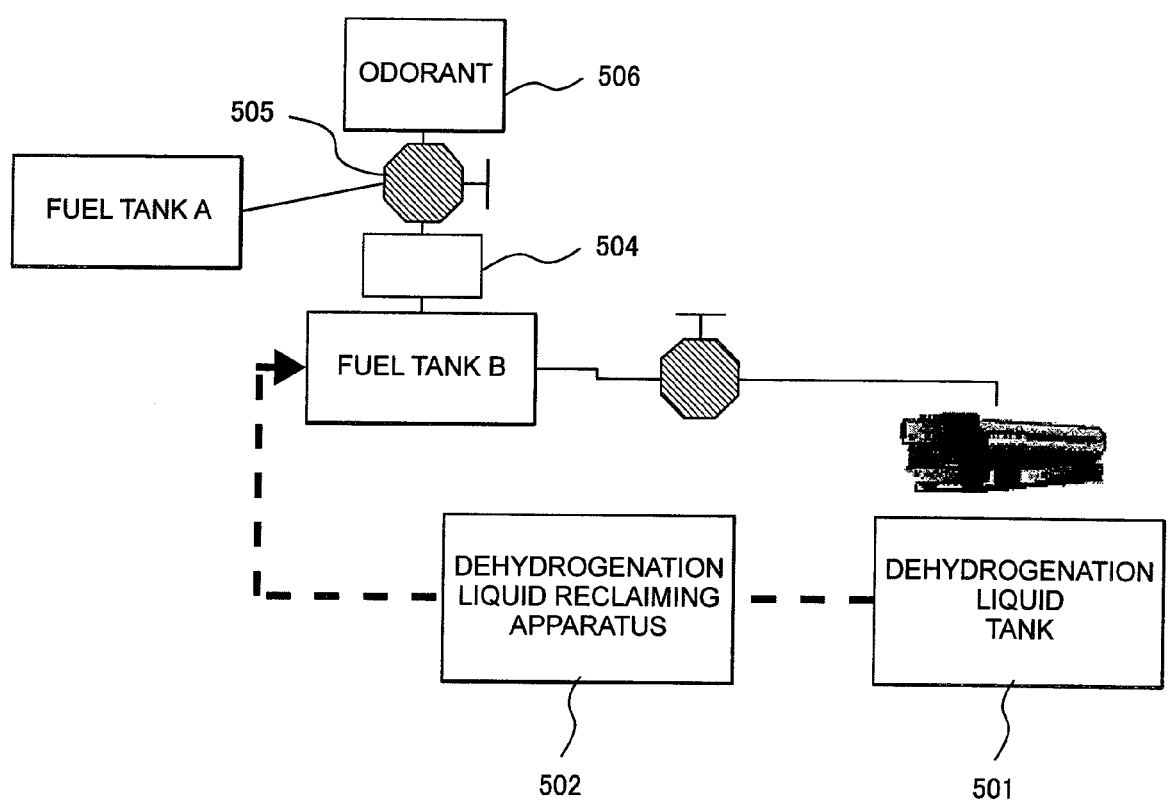
FIG. 5 is a block diagram of a dehydrogenation fuel theft prevention system in a third embodiment.

FIG. 5 is a block diagram of a fuel supply system to which the dehydrogenation fuel theft prevention system in an embodiment of the invention is applied. FIG. 5 illustrates a system for preventing theft by injecting an odorant into fuel beforehand during the course of distribution.

The dehydrogenation fuel theft prevention system in FIG. 5 is constructed of: a dehydrogenation fuel tank 501; a dehydrogenation fuel reclaiming apparatus 502 that reclaims dehydrogenation fuel to manufacture fuel; a fuel tank B for storing fuel obtained by reclaiming dehydrogenation fuel; an odorant tank 506; a concentration sensor 504; and a fuel tank A for storing fuel whose odorant concentration is zero.

In this case, the dehydrogenation fuel reclaiming apparatus 502 is generally designated as hydrogenator. When the dehydrogenation fuel is toluene and the fuel is methylcyclohexane, for example, the reclaiming apparatus adds hydrogen to toluene. In this embodiment, the dehydrogenation fuel reclaiming apparatus 502 need not be a hydrogenator. The fuel tank B and the odorant tank 506 are connected together through a pipe and it is desirable that a part of this pipe should be a valve 505. The fuel tank B and the part of the pipe are provided with a concentration sensor 504 for measuring the concentration of the odorant content of fuel stored in the fuel tank B.

In case fuel with odorant added thereto is used, the following problems can arise when the concentration of the odorant is increased: the quality of the fuel is degraded or the odorant sticks to catalyst material used in the dehydrogenation reaction of the fuel and deteriorates the catalyst material. When the concentration of odorant in fuel is reduced, the effect of the odorant is reduced and the theft prevention effect cannot be expected anymore. For this reason, it is important to keep the odorant in fuel within the range of predetermined values.

Figure 6:
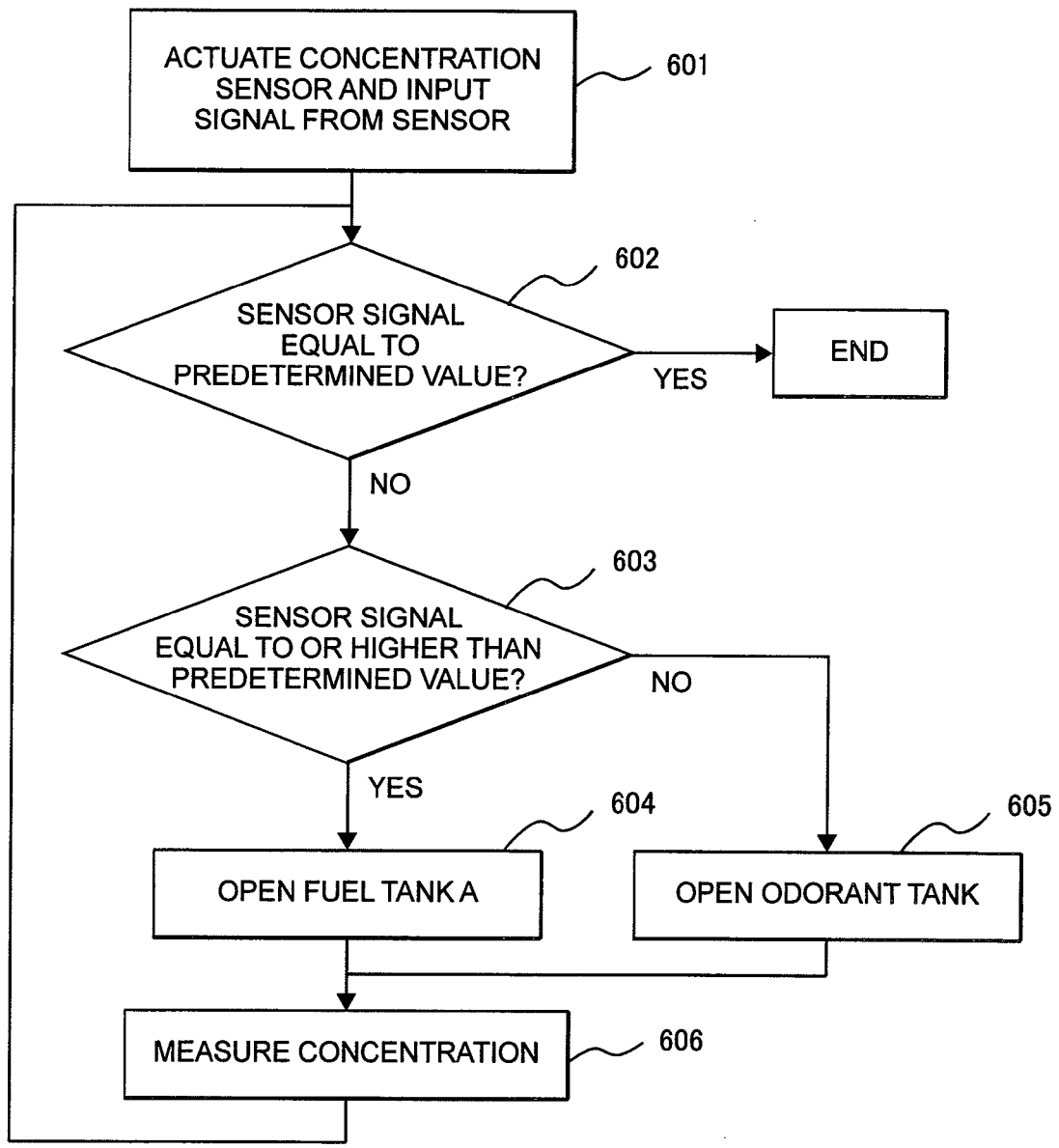
FIG. 6 is a process flowchart of the dehydrogenation fuel theft prevention system in the third embodiment.

Description will be given to the processing to keep the odorant concentration of fuel constant using the concentration sensor in this system configuration with reference to the flowchart in FIG. 6. In this system, dehydrogenation fuel stored in the dehydrogenation fuel tank 501 is reclaimed in the dehydrogenation fuel reclaiming apparatus 502 and stored in the fuel tank B. The odorant concentration of the fuel stored in the fuel tank B is detected with the concentration sensor 504. It is determined whether or not the detected concentration is within the range of predetermined values.

When the concentration of the odorant is equal to or higher than the predetermined value, the valve 505 is controlled to open the fuel tank A. Thus fuel without the odorant added thereto is supplied into the fuel tank B to reduce the concentration of odorant and nestle the odorant concentration into the predetermined range. When the concentration of odorant is lower than the predetermined value, the valve 505 is controlled to open the odorant tank 506. Thus odorant is supplied to the fuel tank B to nestle the odorant concentration into the predetermined range. According to the above-mentioned system, it is possible to keep the odorant concentration of fuel within the range of predetermined values and provide high-quality fuel. Further, it is possible to obtain the effect of theft prevention by odorant added to fuel.

What is claimed is:

1. A dehydrogenation fuel theft prevention system for systems including a reformer for dehydrogenating organic fuel containing at least hydrogen and a dehydrogenation fuel recovery tank for storing dehydrogenation fuel produced when organic fuel is dehydrogenated in the reformer, the dehydrogenation fuel theft prevention system comprising:

a means for mixing an odorant as a component with a pungent odor other than the fuel components with the dehydrogenation fuel when the dehydrogenation fuel is about to be stolen.

2. The dehydrogenation fuel theft prevention system according to claim 1, wherein an odorant is provided at least in one of the walls of the dehydrogenation fuel recovery tank or a dehydrogenation fuel flow path for passing dehydrogenation fuel and configured such that the odorant flows into the dehydrogenation fuel when the wall of the dehydrogenation fuel recovery tank or the wall of the dehydrogenation fuel flow path is pierced.

3. The dehydrogenation fuel theft prevention system according to claim 1, comprising:

a flow or pressure sensor placed in either the dehydrogenation fuel recovery tank or the dehydrogenation fuel flow path for passing dehydrogenation fuel;

a tank for storing an odorant;

a pipe connecting the dehydrogenation fuel recovery tank and the tank for storing an odorant;

an electromagnetic valve provided in the pipe; and a control processor electrically connected with the electromagnetic valve and the sensor configured to open the electromagnetic valve to inject the odorant into the dehydrogenation fuel recovery tank when it is determined that theft is about to occur based on a signal from the sensor.

4. The dehydrogenation fuel theft prevention system according to claim 1, wherein the odorant is selected from the group consisting of an amine compound, an ammonia compound, a nitrate compound, and pyridine.

5. The dehydrogenation fuel theft prevention system according to claim 1, wherein the dehydrogenation fuel recovery tank stores toluene.

6. A dehydrogenation fuel theft prevention system for systems including a reformer for dehydrogenating organic fuel containing at least hydrogen and a dehydrogenation fuel recovery tank for storing dehydrogenation fuel produced when organic fuel is dehydrogenated in the reformer, the dehydrogenation fuel theft prevention system comprising:

a means for mixing a coagulating agent with the dehydrogenation fuel for coagulating the fuel components when the dehydrogenation fuel is about to be stolen.

7. The dehydrogenation fuel theft prevention system according to claim 6, wherein the coagulating agent is provided at least in one of the walls of the dehydrogenation fuel recovery tank or a dehydrogenation fuel flow path for passing dehydrogenation fuel and configured such that the coagulating agent flows into the dehydrogenation fuel when the wall of the dehydrogenation fuel recovery tank or the wall of the dehydrogenation flow path is pierced.

8. The dehydrogenation fuel theft prevention system according to claim 6, comprising:

a flow or pressure sensor placed in either the dehydrogenation fuel recovery tank or the dehydrogenation fuel flow path for passing dehydrogenation fuel;

a tank for storing a coagulating agent;

a pipe connecting the dehydrogenation fuel recovery tank and the tank for storing a coagulating agent;

an electromagnetic valve provided in the pipe; and a control processor electrically connected with the electromagnetic valve and the sensor configured to open the electromagnetic valve to insert the coagulating agent into the dehydrogenation fuel recovery tank when it is determined that theft is about to occur based on a signal from the sensor.

9. The dehydrogenation fuel theft prevention system according to claim 6, wherein the coagulating agent is organogel.

10. The dehydrogenation fuel theft prevention system according to claim 6, wherein the dehydrogenation fuel recovery tank stores toluene.

* * * * *